Feb. 26, 1924.
W. B. McCAIN
1,485,232
CABLE JACK
Filed Sept. 20, 1922      5 Sheets-Sheet 3
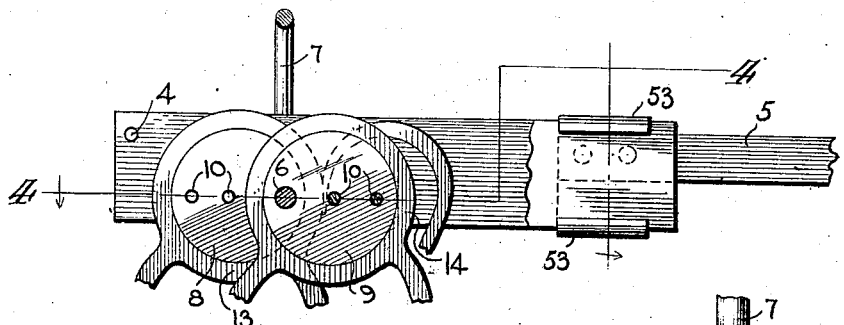
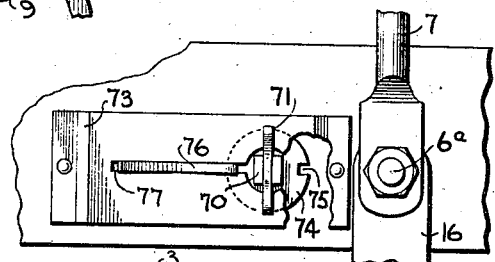
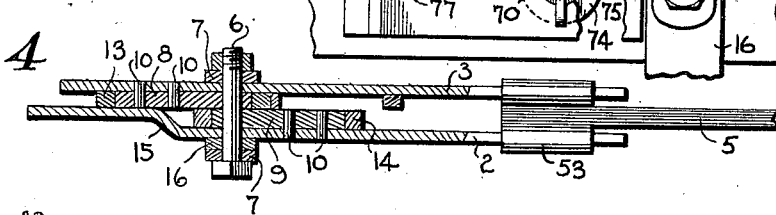
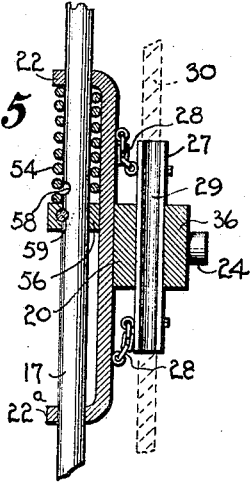
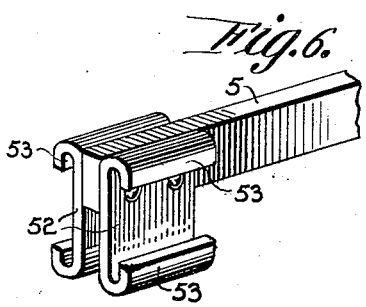
WITNESSES
Inventor
William B. McCain
By E. G. Siggers
Attorney Feb. 26, 1924.
W. B. McCAIN
1,485,232
CABLE JACK
Filed Sept. 20, 1922      5 Sheets-Sheet 4
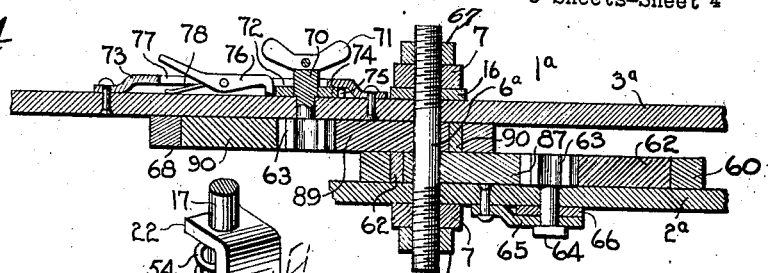
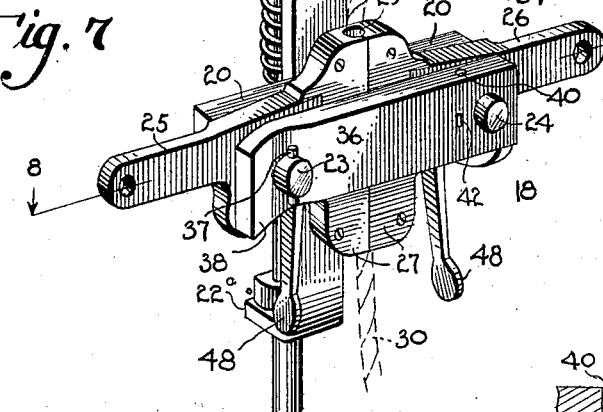
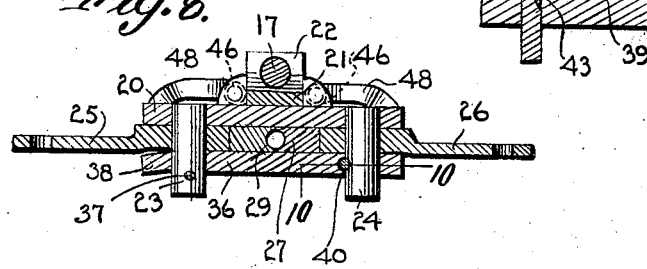
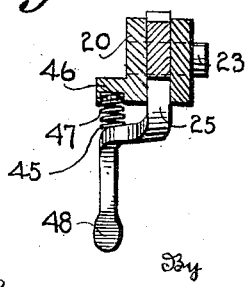
Inventor
William B. McCain Feb. 26, 1924.  
W. B. McCAIN  
CABLE JACK  
Filed Sept. 20, 1922  
1,485,232  
5 Sheets-Sheet 5

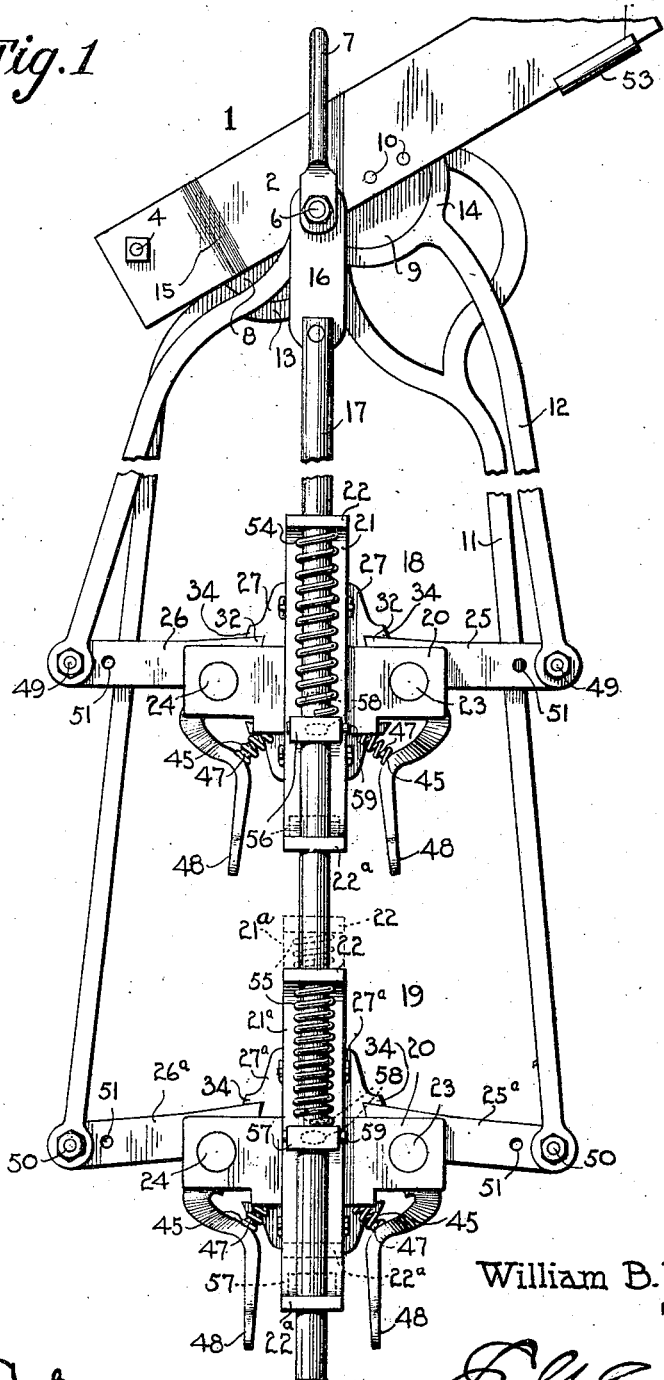

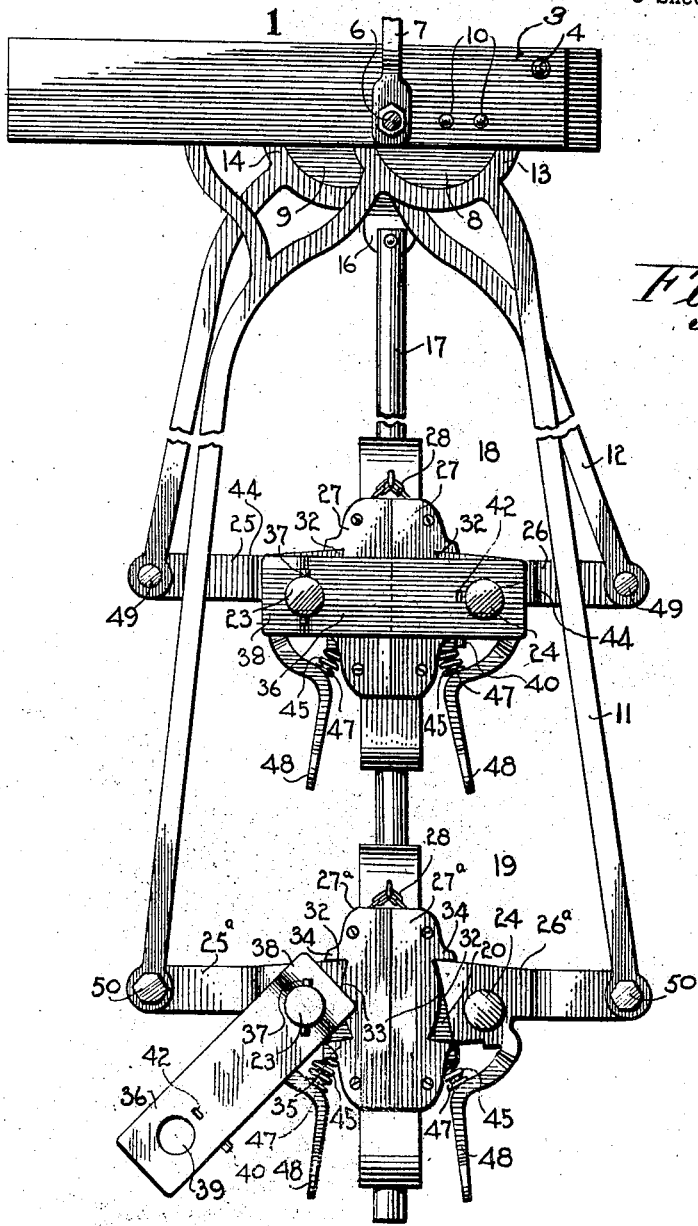

William B. McCain  
INVENTOR

WITNESSES

BY

ATTORNEY

Patented Feb. 26, 1924.

1,485,232

UNITED STATES PATENT OFFICE.

WILLIAM B. McCAIN, OF BLANCHARD, WASHINGTON, ASSIGNOR OF ONE-HALF TO MYOL N. PEASLEE, OF BLANCHARD, WASHINGTON.

CABLE JACK.

Application filed September 20, 1922. Serial No. 589,380.

*To all whom it may concern:*

Be it known that I, WILLIAM B. McCAIN, a citizen of the United States, residing at Blanchard, in the county of Skagit and State of Washington, have invented a new and useful Cable Jack, of which the following is a specification.

This invention relates to cable jacks, and has for its object the provision of a simple strong and reliable device having a powerful leverage which may be employed in pulling stumps, stretching wire, pulling automobiles out of ditches, or hoisting automobiles in garages, and which may be readily reversed to permit a cable under tension to be released step by step.

A further object of the invention is to provide a cable jack in which any portion of a cable may be directly applied to the grips without the necessity of threading, the grips being removable and readily accessible by the release of a keeper.

Another object of the invention is the provision of a device which is equipped with a removable handle whereby the jack may be folded up into a small unit and stored in a small space in some part of the vehicle.

The invention will be best understood from a consideration of the following detailed description taken in connection with the accompanying drawing forming part of this specification, with the understanding however, that the invention is not confined to any strict conformity with the showing in the drawing, but may be changed and modified so long as such changes and modifications mark no material departure from the salient features of the invention as expressed in the appended claims.

In the drawing:

Fig. 1 is a bottom plan view of my improved cable jack.

Fig. 2 is a top plan view of the same.

Fig. 3 is a fragmentary view with parts broken away disclosing the means for operating the links which are operatively connected to the cable grips.

Fig. 4 is a transverse vertical section taken along the line 4—4 of Fig. 3.

Fig. 5 is a longitudinal section showing a detail of the grips and the means for reversing their operation.

Fig. 6 is a view in perspective detailing the connection between the operating handle and the lever head.

Fig. 7 is a detached view in perspective of a clamping head.

Fig. 8 is a transverse vertical section taken along the line 8—8 of Fig. 7.

Fig. 9 is a fragmentary view in section disclosing a means for releasing the grips independently of their normal operation.

Fig. 10 is a sectional view in detail taken along the line 10—10 of Fig. 8.

Fig. 13 is a fragmentary plan view showing a detail of the locking means of the geared cam operating means shown in Fig. 11.

Fig. 14 is an enlarged transverse vertical section of the operating means for the links as shown in Figs. 11 and 12.

Figure 12:
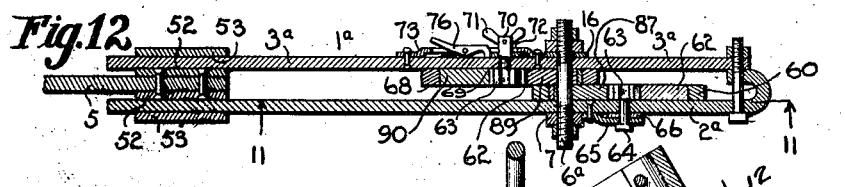
Fig. 12 is a transverse vertical section taken along the line 12—12 of Fig. 11.

Referring to Figs. 1 to 10 of the drawings, 1 designates a lever head which is composed of two bars 2 and 3 joined together at their outer ends by a bolt 4, with their other ends spaced apart to receive a removable operating handle 5. (Figs. 4 and 5.)

In perforations of the bars 2 and 3, and intermediate their ends is mounted a fulcrum shaft 6. The ends of the shaft 6 extend through and beyond the bars 2 and 3 to receive the perforated ends of a clevis 7.

Between the bars 2 and 3 are mounted cam disks 8 and 9 which are placed in overlapping relation and are eccentrically mounted on the fulcrum shaft 6, with the inner face of the bar 2 in engagement with the disk 9, and the inner face of the bar 3 in engagement with the disk 8, the disk 8 being secured by means of rivets 10 to the bar 3, while the disk 9 is eccentrically secured to the bar 2 by means of rivets 10.

A pair of substantially U-shaped links 11 and 12 are mounted respectively on the cam disks 8 and 9. The U-shaped link 11 has a reduced end or head 13 provided with a circular opening which is adapted to snugly receive the cam disk 8. The U-shaped link 12 has a reduced end or head 14 provided with a circular opening to snugly receive the cam disk 9, the head 13 of the link 11 being in engagement with the inner face of the bar 3, while the head 14 of the link 12 is in engagement with the inner face of the bar 2.

It will be seen from this arrangement that the heads 13 and 14 of the respective links 11 and 12 are seated neatly upon each other and located between the bars 2 and 3, whereby no lateral movement is permitted of the cams 8 and 9 and the heads 13 and 14 when in position. As a further aid in preventing any lateral movement of the disks 8 and 9, or the heads 13 and 14, and thereby preventing distortion of said heads or the links 11 and 12, the bar 2 is offset as shown at 15 in Figs. 1 and 4, so that the inner faces of the outer free ends of the bars 2 and 3 will be in engagement with the opposite faces of disk 8 and the head 13 of the link 11.

Connected by a link 16 to the fulcrum shaft 6 is a guide rod 17 running centrally and longitudinally of the cable jack but offset from the planes of the links 11 and 12.

Slidably mounted on the guide rod 17 are a pair of spaced clamping heads 18 and 19. Each clamping head comprises a transverse base bar 20, to which is secured a slide bar 21 extending longitudinally of the rod 17 and at right angles to the base bar. The slide bar 21 is provided with upturned lugs 22 and 22$^a$ which are perforated, and through said perforations is adapted to be inserted the guide rod 17, so that as the bar 21 moves along the guide rod 17, the base bar 20 will be carried with the same. The bar 20 of clamping head 18 is provided with spaced upstanding posts 23 and 24 upon which are pivotally mounted the respective operating levers 25 and 26.

Between the operating ends of the levers 25 and 26, and on the base bar 20, are a pair of grips or cable clamping members 27, which are removably mounted between the ends of the levers 25 and 26, but are limited in their movement by means of chains 28 which prevent the grips 27 from being accidentally separated from the jack.

The clamping head 19 is similar in construction to the clamping head 18, and comprises a bar 21$^a$ slidable on the guide rod 17, and grips 27$^a$ operated by levers 25$^a$ and 26$^a$.

As shown in Figs. 5, 7 and 8, each one of the grips is provided at their inner adjacent edges with semi-cylindrical grooves 29, which when abutted form a passage in which a cable 30 is adapted to be inserted. The outer side edges of the grips are cut away as shown in Fig. 2, to receive the operating ends 32 of the levers 25 and 26, or levers 25$^a$ and 26$^a$. The cut-out portions of the grips have a rounded portion 33 located between shoulders 34 and 35 and engageable with the operating ends of the levers.

The toes 32 of the levers 25, 26, 25$^a$ and 26$^a$ are adapted to engage the shoulders 34 at certain times during the movement of said levers to move the grips 27 or 27$^a$ towards the lever head 1, and thereby open the grips. When the toes 32 move in the opposite direction, they engage the curved portions 33 of the clamping members or grips and force said clamping members in gripping relation with the cable 30.

Each pair of grips 27 or 27$^a$ are maintained in position between the toes 32 of the operating levers and on a base bar 20 by means of a keeper 36 pivoted on the post 23. A pin 37 passing through a perforation in the post 23 prevents the keeper 36 from accidental removal from the post 23. Said keeper is provided with an offset portion 38 so that the said bar may be tilted upwardly to release the post 24 from an opening 39 in the keeper 36, whereby said bar may be swung to one side to permit the removal of the grips 27 or 27$^a$.

A pin 40 slidable in a transverse passage adjacent the opening 39 of the keeper 36 is adapted to engage a notch 41 in the post 24 and thereby lock the keeper 36 in position. The end of a pin 42 projects into the transverse passage and into a notch 42$^a$ of the slidable pin 40 to prevent loss of the pin, but to permit movement of said pin. The pin 40 is provided with a notch 43 adapted to register with the post 24 whereby the post may freely slide through the perforation 39 when the keeper 36 is removed.

Each spring 45 having one end seated in a socket 46 of the base bar 20 and its other end engaging a lug 47 on the operating arms 48 of the levers 25 and 26, or 25$^a$ and 26$^a$, will tend to force the arms 48 outwardly and thereby maintain the toes 32 of said operating levers in engagement with the curved surfaces 33 of the grips 27 or 27$^a$ to cause said grips to clamp the cable 30 during certain positions of the operating levers.

The clamping head 19 is similar to the construction of clamping head 18, but the grips 27$^a$ are operated by their respective operating levers 25$^a$ and 26$^a$ through link 11, in a direction which is opposite to the direction of movement of grips 27 which are operated by the link 12. The outer free ends of the levers 25 and 26 are respectively pivoted at 49 to the ends of the U-shaped link 12, while the levers 25$^a$ and 26$^a$ are respectively pivoted at 50 to the free ends of the U-shaped link 11. The operating levers are provided with auxiliary perforations 51 whereby the ends of the links 12 and 11 may be connected with the levers 25, 26 and 25$^a$, 26$^a$, at a point closer to the pivots of said levers in order to reduce the length of the strokes of said levers and thereby cause the grips 27 and 27$^a$ to be operated more rapidly. The construction just described, and which is disclosed more particularly in Figs. 1 and 2, is adapted to grip a cable or wire for stretching the same, or for any lifting or pulling purposes.

The guide rod 17 which permits the clamping heads 18 and 19 to slide on said rod prevents independent side motion of the heads. The link connection 16 of said rod permits the clamping heads to oscillate to one side, but the guide rod always maintains the clamping heads in alinement with each other and in line with the cable. Otherwise, if the clamping heads were not so alined the grips would bind.

The operating handle 5 is provided at its ends with spaced receiving members 52 having outwardly and inturned flanges 53 spaced from the members 52 in order to receive the free ends of the bars 2 and 3. (Fig. 6.)

The operation of the device described so far is as follows:—

As shown in Fig. 2, it is not necessary to thread the cable through the grips, as is usually done, but the bars 36 may be moved to one side on the pivot post 23, after the pin 40 has been released from its engagement with post 24. The bar 36 is swung to one side so that the grips 27 and 27ª are exposed and easily accessible for the application of the cable. The grips are then tilted slightly to expose the gripping surfaces 29 of said grips, whereby the cable may be laid bodily between the grips 27 and the grips 27ª. The grips having been replaced, the keepers 36 are again moved to their normal position and the pins 40 adjusted to lock the keepers upon the posts 23 and 24.

The levers 25 and 26 are offset as shown at 44, Fig. 2, in order to accommodate the movement of the arms of the U-shaped link 11 and permit the same to be oscillated close to the arms of the U-shaped link 12.

As the handle 5 is rocked away from the clamping heads in Fig. 2, link 11 is moved in the opposite direction, while link 12 is moved in the same direction with the handle, thereby causing the toes 32 of the levers 25 and 26 to be moved away from the head 14 and engage the rounded portion 33 of the grips, and causing the grips 27 to firmly clamp the cable. A continued backward movement of the lever 5 causes the clamping head 18 to be moved bodily on the rod towards head 14 and exert a pull on said cable, and since the outer ends of the levers 25ª and 26ª are being moved away from clamping head 18, the toes 32 of said levers will be moved towards clamping head 18 and release the grips 27ª, thereby permitting the cable to slide freely through these grips and be drawn taut by the grips 27. The springs 45 are adapted, when a pull is exerted upon the cable by either pair of the grips 27 or 27ª, to maintain the grips in engagement with the cable, since the arms 48 of said levers are moved outwardly from rod 17 with springs 45 expanding.

When the lever 5 of the lever head 1 is thrown towards the clamping heads, link 11 will be shifted in the opposite direction, with the outer ends of the levers 25ª and 26ª moving in that direction and causing the grips 27ª to firmly engage the cable 30, while link 12 will be shifted towards clamping head 19 with the outer free ends of the levers 25 and 26 likewise moving in the same direction with link 12. The toes 32 are moved towards the lever head thus releasing the grips 27, whereby the cable will be moved freely between the clamping faces of the grips. The springs 45 of clamping head 18 are now compressed and inoperative. When the lever 5 is again moved away from the clamping heads, clamping head 18 will grip the cable and exert a pull on the same while clamping head 19 will release the cable, permitting the cable to slide through the grips 27ª. A constant movement of the lever towards and away from the clamping heads will cause the grips 27 and 27ª to alternately clamp and pull the cable, then release it.

The clevis 7 is anchored by means of a cable in any suitable manner to some support.

In order to reverse the operation of the grips 27 and 27ª, just described, to permit the grips to release a load on the cable, step by step, I employ coiled springs 54 and 55 which are mounted on the guide rod 17 between the lugs 22 and 22ª of the bars 21 and 21ª, as shown in Fig. 1. The coiled springs 54 and 55 are ordinarily placed under a certain amount of compression by means of the respective stops 56 and 57, which are slidable on the guide rod 17 between the lugs 22 and 22ª of the bars 21 and 21ª. At certain intervals between the lugs 22 and 22ª of slide bars 21 and 21ª, the guide rod is provided with notches 58. Pins 59 slidable in the stops 56 and 57 are adapted to engage one of the notches 58 when said pin is shoved to the left and sufficiently inwardly of the stops 56 and 57 by pressure of the thumb. Ordinarily, when the cable jack is operated to tighten the cable 30 for pulling a load, the stops 56 and 57 will be released from their positions and located in the dotted line position so that the springs 54 and 55 will remain inoperative. The construction of the pins 59 and stops 56 and 57 are identical with the construction of pins 40 in the keepers 36 as disclosed in Fig. 10.

In order to position stop 56, the lever head is moved to its extreme outward position shown in Fig. 1, the clamping jaws 27 being in gripping relation with the cable, while clamping jaws 27ª have released the cable. The slide bar 21 has been moved closer to the lever head along the guide rod 17, thereby moving the lug 22 of the slide 21 to a distance from the notch 58 along the rod 17, which is substantially the length of the coil spring 54 when not under tension. The stop 56 is moved from its dotted line position to the full line position adjacent a notch 58, and the pin 59 is moved to the left causing said pin to engage the notch and lock the stop in position. As long as the spring 54 is not under compression, springs 45 of lever head 18 are acting to force arms 48 outwardly and cause levers 25 and 26 to move the clamping members 27 into gripping engagement with the cable and thereby maintain the load on the cable.

In order to position stop 57, lever head 1 is then moved in the opposite direction from that indicated in Fig. 1, when slide 21 will be moved away from the lever head, compressing spring 54 between the lug 22 and the stop 56, thereby overcoming the pressure of springs 45 and releasing the jaws 27. Jaws 27$^a$ are moved into gripping relation with the cable and thus maintain the load. Slide bar 21$^a$ has been moved to the dotted line position with the distance between the lug 22 and one of the notches 58 substantially equal to the length of the expanded coiled spring 55. The stop 57 is then moved along the rod 17 from its dotted line position until it is in alinement with a notch 58, when the pin 59 is forced to the left, thereby locking the stop 57 in place and in engagement with one end of the spring 55. The cable jack is now set for reverse movement to release the cable 30 step by step until the load is released from the cable, when the jack may be slid along the cable. The jaws remain inoperative when there is no tension on the cable.

When releasing the cable with springs 54 and 55 thus set for action, lever 5 is moved away from the clamping heads with clamping head 18 backing up on the cable and permitting the cable to slide through it, while clamping head 19 holds the cable and slowly feeds it out, the load on the cable assisting clamping head 19 to maintain its grip on the cable. Near the end of the outward movement of the lever head, clamping head 18 takes the load while clamping head 19 is relieved of the load. When lever head 1 is thrown towards the clamping heads, the clamping heads are moved towards each other and the cable gripped by clamping head 18, is forced through clamping head 19, the grip of which is released. Spring 54 is now being compressed between stop 56 and lug 22 while spring 55 is being released. As spring 55 is released as shown in dotted line, Fig. 1, springs 45 act on the levers 25$^a$ and 26$^a$, causing them to grip the cable and the load on the cable aids in maintaining the grip of the clamping head 19 on the cable since the cable tends to force head 19 away from head 18. When spring 54 has been compressed at the end of this stroke of the lever head, clamping head 18 releases the cable while clamping head 19 takes the load with spring 55 expanded. Upon a reversal of the lever head, clamping head 18 moves back upon the cable while clamping head 19 gripping the cable moves away from the clamping head 18 carrying the cable forward and playing the same out, the cable all the while sliding through clamping head 18.

The more powerful springs 54 and 55 will never allow the grips to take hold of the cable until the tension is nearly removed from them.

Continuous operation of the lever head 1 to the right and left will pay the cable out step by step. If it is desired to again exert a pull on the cable for lifting some load, the pins 59 will be driven inwardly towards the right in Fig. 1, whereby the pins 59 will be released from one of the slots 58 and the springs 54 and 55 will force the stops 56 and 57 towards the other ends of the bars 21 and 21$^a$. The coil springs 54 and 55 always remain idle when the jack is pulling a load. In either case, whether reversing or pulling a load, the cable may be released from any clamping head by pressing the arms 48 towards each other, when the noses 32 of the levers 25, 26 and 25$^a$, 26$^a$ act against shoulder 34 of the grips and release them from the cable.

The links 11 and 12 are caused to oscillate in substantially straight lines by means of the cam disks 8 and 9 operating in the circular openings in the heads 13 and 14, respectively, of the links 11 and 21, and also by reason of the fact that the clamping heads 18 and 19 are slidable through the bars 21 and 21$^a$ on the guide rod 17. The disks 8 and 9 are both mounted rotatably yet eccentrically on the fulcrum shaft 6, while the bar 2 of the lever head is eccentrically connected to the disk 9 and the bar 3 is eccentrically connected to the cam disk 8. As the lever head 1 is oscillated on the fulcrum shaft 6, the cam disk 9 will be caused to partially rotate around the fulcrum shaft 6 as a pivot, while the cam disk 8 will be caused to revolve around the same shaft as a center but in the opposite direction, whereby the link 12 is oscillated in one direction while the link 11 is oscillated in the opposite direction.

Referring to Figs. 11, 12, 13 and 14, which disclose a modification of the device shown in Figs. 1 to 10, it will be seen that the important distinctions between the two devices is in the form of the geared grips which are engaged by the eccentric segmental gears of the operating levers, and the cam gearing for operating the links; otherwise, the related parts are substantially the same and the manner of placing the cable under tension and the mode of reversal are the same.

Figure 11:
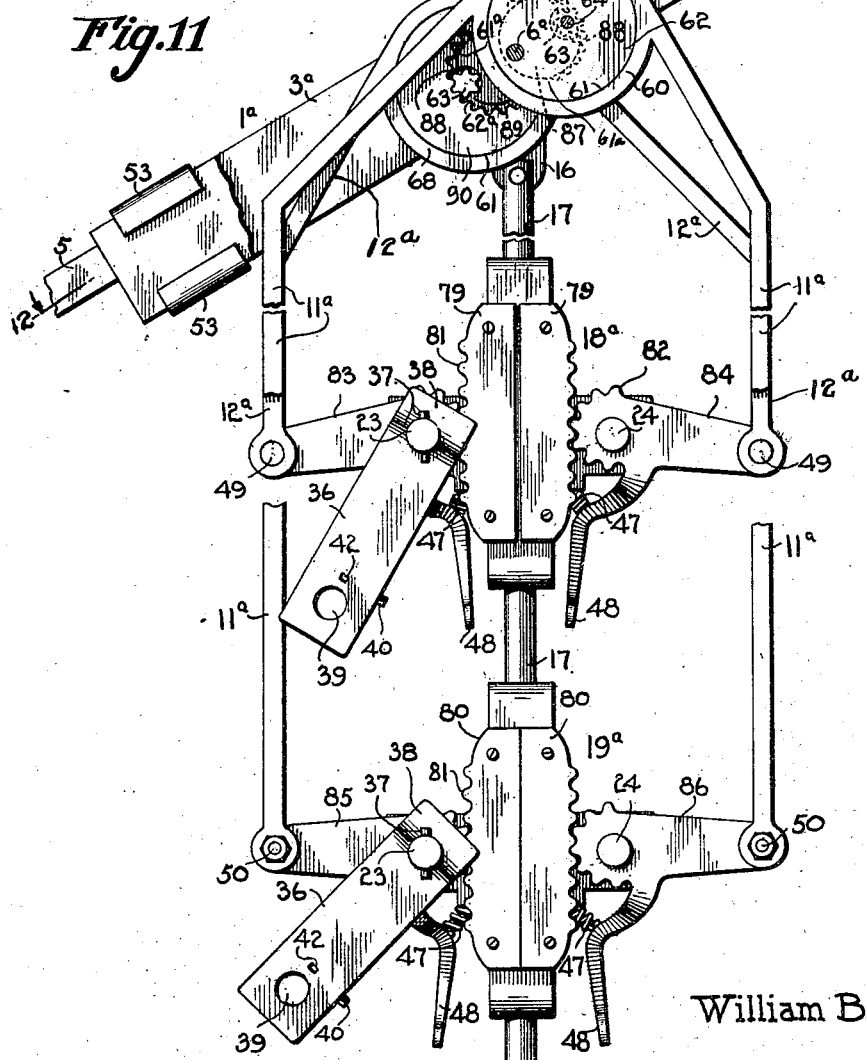
Fig. 11 is a top plan view of a modification of the invention.

Referring more particularly to Fig. 11, link 11ª is provided with a circular head 60 having a circular opening 61 in which is loosely received a cam member 62, provided with an eccentric opening 61ª, a portion of the periphery of which is provided with teeth as shown at 62ª, which are engageable with a gear 63 secured to a shaft 64. The shaft 64 passes through a bearing formed in the bar 2ª and is prevented from displacement from said bearing by means of a cleat 65 which is spaced from the bar 2ª by a washer 66.

Mounted in the opening 61ª, and rigidly secured to the bar 2ª, by means of rivets, is a disk 87 having an opening 88. The gear 63 is located within the opening 88, with its opposite faces lying within the planes passing through the opposite faces of the disk 87. The member 62 is adapted to be rotated on the disk 87 and within the circular opening 61 of the head 60.

Mounted in the spaced bars 2ª and 3ª of the lever head 1ª is a fulcrum shaft 6ª which extends beyond the outer sides of the bars 2ª and 3ª and is secured in place by means of nuts 67.

The fulcrum shaft 6ª (Fig. 14) passes through perforations not only in the bars 2ª and 3ª, but through the perforations in the disk 87, and likewise through a perforation in a disk 89, which has a partial face to face engagement with the disk 87. The head 68 of the link 12ª is likewise provided with an opening 61, with the gear 63 mounted in an opening 88 of the disk 89 and in mesh with teeth 62ª provided on a portion of the periphery of an opening 61ª formed in the loosely mounted member 90. The member 90 is rotatable on the disk 89 and within the circular opening 61 of the head 68. The gear is mounted on a shaft 69 which has a bearing in the bar 3ª. The shaft 69 rotates the gear 63 and has at its outer projecting end a square bifurcated portion 70 shown more particularly in Fig. 13, in which is pinned a wing member 71. The square portion 70 of the shaft 69 is rotatable in a slot 72 in a bracket 73. Between the bracket 73 and the bar 3ª is mounted a circular disk which is rigid with the shaft 69 and provided with a plurality of notches 75 adapted to be engaged by a latch member 76 pivotally mounted in a narrow elongated slot 77 of the bracket 73. A spring 78 maintains the latch 76 in engagement with any one of the notches 75. The disk 74 is provided with a squared central opening through which is inserted the squared end 70 of the shaft 69 so that said disk 74 will be rotated with the shaft 69 and the gear 63, when the keeper 76 is maintained out of engagement with one of the notches 75. Otherwise, the keeper, when engaged with one of the notches 75, will lock the disk 74, the gear 63, and likewise the loosely mounted member 90 from rotation relative to each other.

In Fig. 11, the grips 79 and 80 of the clamping heads 18ª and 19ª, are provided with teeth 81 upon their outer longitudinal edges, which are adapted to be engaged by teeth 82 of the geared sectors formed on the ends of the operating levers 83, 84, 85 and 86.

The levers in this case are eccentrically mounted on the posts 23 and 24 as was disclosed in the other forms. The levers 83 and 84 are pivotally connected at their outer ends to the arms of the U-shaped link 12ª, as shown at 49 in Fig. 11, the arms of the U-shaped link 11ª being broken away to disclose the connection. The arms of the U-shaped link 11ª are pivotally connected at 50 to the outer ends of the links 85 and 86.

When either pair of the levers 83, 84, or 85, 86 are oscillated upon their respective posts 23 or 24 as a pivot, the teeth 82 of said levers will engage the teeth 81 of the grips 79 or 80, and by reason of the eccentric mounting of the toothed sector of said levers, the grips will be forced into engagement to bite the cable, when the ends of either one of the pairs of levers will be moved towards the top of the machine, and when the ends of the levers are moved in the opposite direction the geared grips will be released.

The top plan view only of the modification, as disclosed by Fig. 11, is shown. Nevertheless, the bottom plan view of this modification will disclose the same features, including the springs 54 and 55 and the stops 56 and 57, whereby when said stops are moved to the position shown in Fig. 1, and the lever head 1ª is operated, the machine will be backed up or reversed to release the cable.

When these stops have been released from their position on the guide rod 17, the heavy compression springs 54 and 55 will be inoperative, whereby on oscillation of the lever head 1ª with the cable 30 in position between the jaws of the gripping heads 18ª and 19ª, the cable will be alternately gripped and released and drawn taut.

When it is desired to adjust the links 11ª and 12ª relative to each other, the latch 76 is released from the disk 74 and the shaft 69 is rotated through the member 71, whereby the gear 63 is rotated, causing rotation of the loosely mounted member 90, since said gear meshes with the teeth 62ª of the loosely mounted member.

When the gear 63 is rotated, the member 90 is swiveled around, thus changing the relative positions of the cams 62 and 90, thereby giving greater or less power as the occasion may arise.

The replacement of the latch 76, for engagement with another notch in the disk 74, holds the cam 90 in the adjusted position.

In the modified form, the gears 63, by reason of their engagement with the teeth 62ª of the respective loosely mounted members 62 and 90, will lock the loosely mounted members in position relative to the bars 2ª and 3ª, and when the lever head 1ª is oscillated, the eccentric mounting of the members 62 and 90 will cause oscillation of the links 11ª and 12ª.

The clamping members are set in operation by the oscillation of the links through the racks and toothed sectors and grip the cable immediately whenever the levers 83 and 84 or 85 and 86 are operated, so that no lost motion is had between the time of the release of the cable and the gripping of the cable.

The device disclosed by the modified form is employed principally for heavy duty, such as pulling stumps, trucks, or for hoisting heavy articles.

What is claimed is:—

1. A cable jack comprising a lever head, pairs of clamping jaws, a fulcrum shaft mounted in the lever head, disks eccentrically mounted on the fulcrum shaft and secured eccentrically to the lever head, and links having circular openings at one end to receive the disks and connected at their other ends to operating levers for the clamping jaws.

2. A cable jack comprising a lever head, pairs of clamping jaws, a fulcrum shaft mounted in the lever head, disks eccentrically mounted on the fulcrum shaft and secured eccentrically to the lever head, and links having circular openings at one end to receive the disks and connected at their other ends to operating levers for the clamping jaws, said clamping jaws adapted to be operated simultaneously for alternately gripping and releasing a cable, and separate means for releasing any pair of the closed jaws.

3. A cable jack comprising a lever head, clamping heads operatively connected to the lever head by links, said clamping heads adapted to alternately grip and release a cable, and separate means for causing the clamping heads to release the cable.

4. A cable jack comprising a lever head, pairs of clamping jaws, a fulcrum shaft mounted in the lever head, disks eccentrically mounted on the fulcrum shaft and secured eccentrically to the lever head, links having circular openings at one end to receive the disks and connected at their other ends to operating levers for the clamping jaws, each pair of clamping jaws adapted to alternately grip and release a cable, and separate means for releasing any pair of the closed jaws, and spring means tending to close the jaws.

5. A cable jack comprising a lever head, pairs of clamping jaws, a fulcrum shaft mounted in the lever head, disks eccentrically mounted on the fulcrum shaft and secured eccentrically to the lever head, links having circular openings at one end to receive the disks and connected at their other ends to operating levers for the clamping jaws, each pair of clamping jaws adapted to alternately grip and release a cable.

6. A cable jack comprising a lever head, pairs of clamping jaws, a fulcrum shaft mounted in the lever head, disks eccentrically mounted on the fulcrum shaft and secured eccentrically to the lever head, links having circular openings at one end to receive the disks and connected at their other ends to operating levers for the clamping jaws, said clamping jaws adapted to be alternately opened and closed, separate means for releasing any pair of the closed jaws, spring means tending to close the jaws, and means for compressing the spring means when said jaws are closed.

7. A cable jack comprising a lever head, pairs of clamping jaws, a fulcrum shaft mounted in the lever head, disks eccentrically mounted on the fulcrum shaft and secured eccentrically to the lever head, links having circular openings at one end to receive the disks and connected at their other ends to operating levers for the clamping jaws, said clamping jaws adapted to be alternately opened and closed, separate means for releasing any pair of the closed jaws, spring means normally inoperative when a cable is being stretched, and means for causing the spring to become operative whereby when the lever head is operated the cable will be released step by step through the jaws.

8. A cable jack comprising a lever head, pairs of clamping jaws, a fulcrum shaft mounted in the lever head, disks eccentrically mounted on the fulcurm shaft and secured eccentrically to the lever head, links having circular openings at one end to receive the disks and connected at their other ends to operating levers for the clamping jaws, said clamping jaws adapted to be alternately opened and closed, separate means for releasing any pair of the closed jaws, spring means tending to close the pairs of jaws alternately when the lever head is operated to release the cable, means for compressing the spring means when said jaws are closed, and means for releasing the springs whereby the jaws when operated will stretch the cable.

9. A cable jack comprising a lever head, pairs of clamping jaws operatively connected to the lever head by links, said pairs of jaws adapted to alternately grip and release a cable and being removable whereby any portion of a cable may be directly applied between the cooperating gripping faces of the jaws.

10. A cable jack comprising a lever head, pairs of clamping jaws operatively connected to the lever head by links, said pairs of jaws adapted to alternately grip and release a cable, said jaws being removable whereby any portion of a cable may be directly applied between the cooperating gripping faces of the jaws, and a removable keeper for maintaining the jaws in coacting relation.

11. A cable jack comprising a lever head, pairs of clamping jaws operatively connected to the lever head by links, said pairs of jaws adapted to alternately grip and release a cable, said jaws being removable whereby any portion of a cable may be directly applied between the cooperating gripping faces of the jaws, and a tiltable keeper pivotally mounted on the clamping head for maintaining the jaws in coacting relation.

12. A cable jack comprising a lever head, clamping heads provided with pairs of removable clamping jaws, links operatively connecting the lever head with the clamping heads, the said clamping heads being provided with spaced posts, and movable means locked on the clamping heads for maintaining the jaws in coacting relation with each other, said movable means permitting access to the jaws for the direct application of any portion of the cable to the pairs of jaws.

13. A cable jack comprising a lever head, clamping heads provided with pairs of removable clamping jaws, links operatively connecting the lever head and the clamping heads, the said clamping heads being provided with spaced posts, a keeper pivoted on one of the posts for maintaining the clamping jaws in coacting relation with each other, and locking means on the keeper and engaging the other post for locking the keeper in position.

14. A cable jack comprising a lever head, clamping heads each provided with a pair of clamping jaws, links operatively connecting the lever head and the clamping heads, said jaws being removable, a keeper pivotally mounted on the clamping head for maintaining the jaws in coacting relation, and a separate means to prevent loss of the clamping jaws when said keeper has been released.

15. A cable jack comprising a lever head, pairs of clamping jaws, a fulcrum shaft mounted in the lever head, disks eccentrically mounted on the fulcrum shaft and secured eccentrically to the lever head, links having circular openings at one end to receive the disks and connected at their other ends to operating levers for the clamping jaws, and a removable handle having at one end means to embrace one end of the lever head.

16. In a cable jack, a lever head comprising a pair of bars connected together at one end, a fulcrum shaft having its ends mounted in the bars, disks eccentrically and rotatably mounted on the fulcrum shaft, clamping heads, and links having openings at one end to receive the disks, the links and disks being in overlapping relation and embraced on opposite sides by the bars, the disks being secured eccentrically to the adjacent inner sides of said bars.

17. In a cable jack, a lever head comprising a pair of spaced bars, a fulcrum shaft mounted transversely of the bars and having its ends journaled in the bars, disks eccentrically mounted on the fulcrum shaft and located in overlapping relation between the bars with the opposite sides of the disks in engagement with the inner faces of the adjacent bars, each being secured eccentrically to an adjacent bar, a rod pivotally mounted on the fulcrum shaft and depending from the lever head, clamping heads slidable on said rod, and links pivotally connecting the lever head to the clamping heads, the ends of the links being provided with openings to receive the disks.

18. A cable jack comprising a lever head, a guide rod, clamping heads operatively connected to the lever head by links and slidable on the guide rod, a resilient means confined to each clamping head, mounted on the guide rod, and adapted to remain idle when the cable jack is pulling a load, and means for causing the resilient means to become active whereby the clamping heads will release the load step by step when the lever head is oscillated.

19. A cable jack comprising a lever head, a guide rod, clamping heads operatively and independently connected to the lever head by links and each provided with a bar slidable on the guide rod, a resilient means mounted on the guide rod between the ends of each slide bar and adapted to remain idle when the cable jack is pulling a load, and a stop slidable on the guide rod between the ends of each slide bar and adapted to be secured in position on the guide rod to confine each resilient means, whereby on operation of the lever head the resilient means will be alternately compressed and released by the stop approaching or moving away from an end of the slide bar, causing the clamping heads to release the load step by step.

20. A cable jack comprising a lever head, a guide rod, clamping heads operatively connected to the lever head by links, a slide bar connected with each lever head and having perforated lugs at its ends to receive the guide rod, a coiled spring mounted on the guide rod between the lugs of each slide bar and adapted to remain idle when the cable jack is pulling a load, and a stop slidable on the guide rod between the lugs of each slide bar and adapted when secured in a predetermined position from the lugs of each slide bar to cause the springs to be compressed between one of the lugs and the stop, or alternately released when the lever head is operated, whereby the clamping head will release the load step by step.

21. A cable jack comprising a lever head, a guide rod, a pair of clamping heads, a pair of substantially U-shaped links, one of greater length than the other, a pair of levers carried by each link and engaged with the clamping heads, means connecting the links with the lever head whereby movement of the latter reciprocates the links, springs mounted on the guide rod, stops on the rod for the springs and means slidably connecting the clamping heads with the guide rod.

In testimony, that I claim the foregoing as my own, I have hereto affixed my signature.

WILLIAM B. McCAIN.